United States Patent Office 2,987,263
Patented June 6, 1961

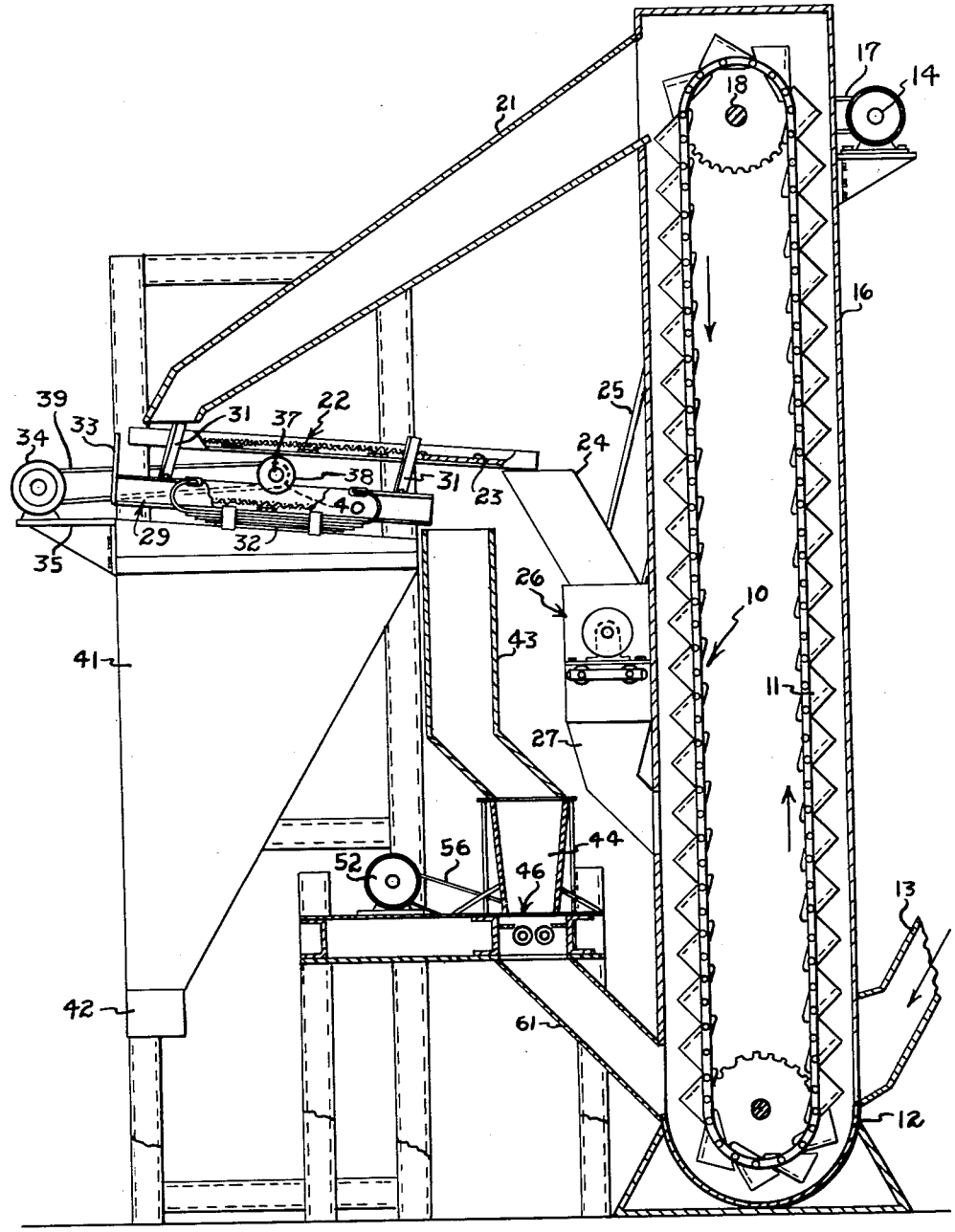

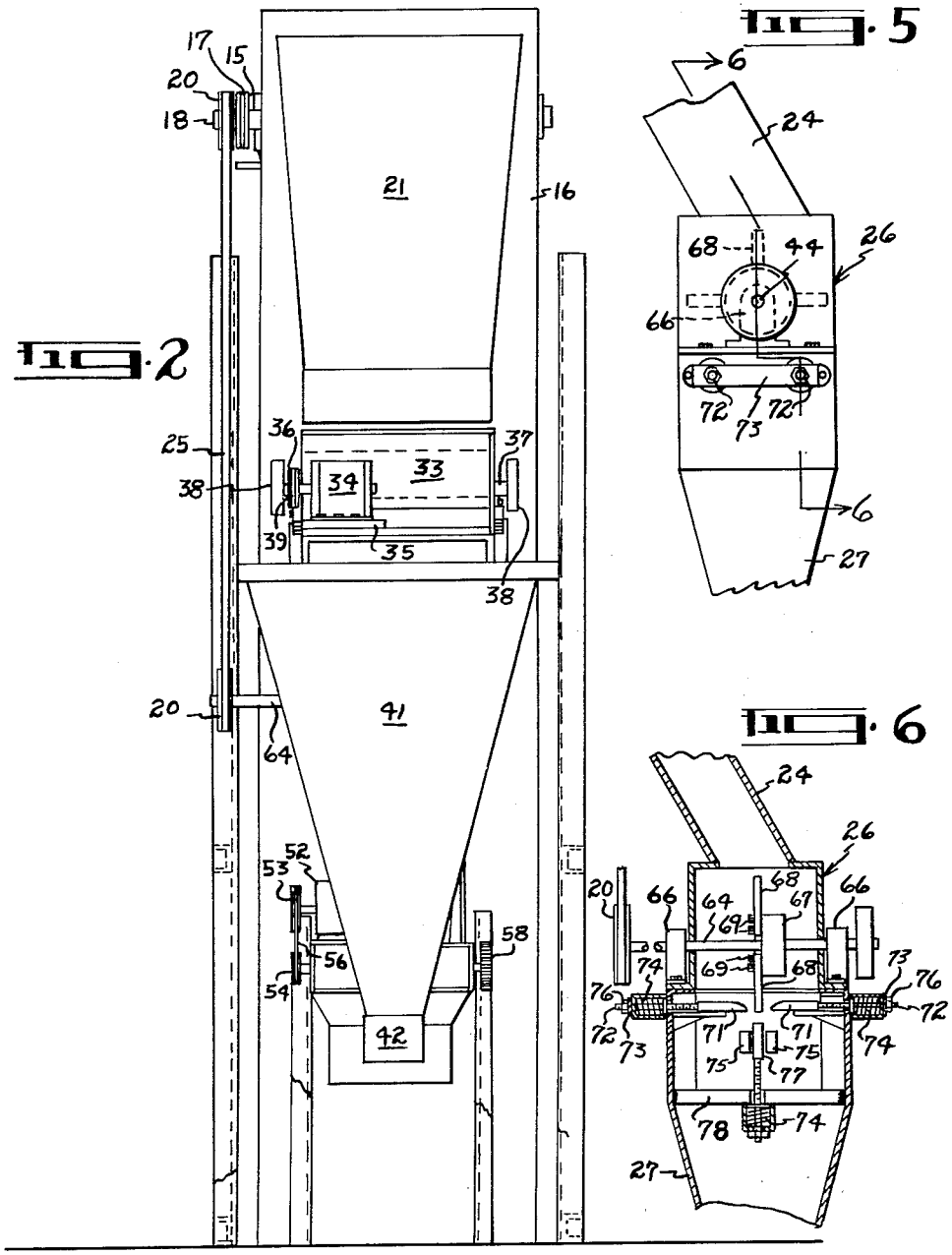

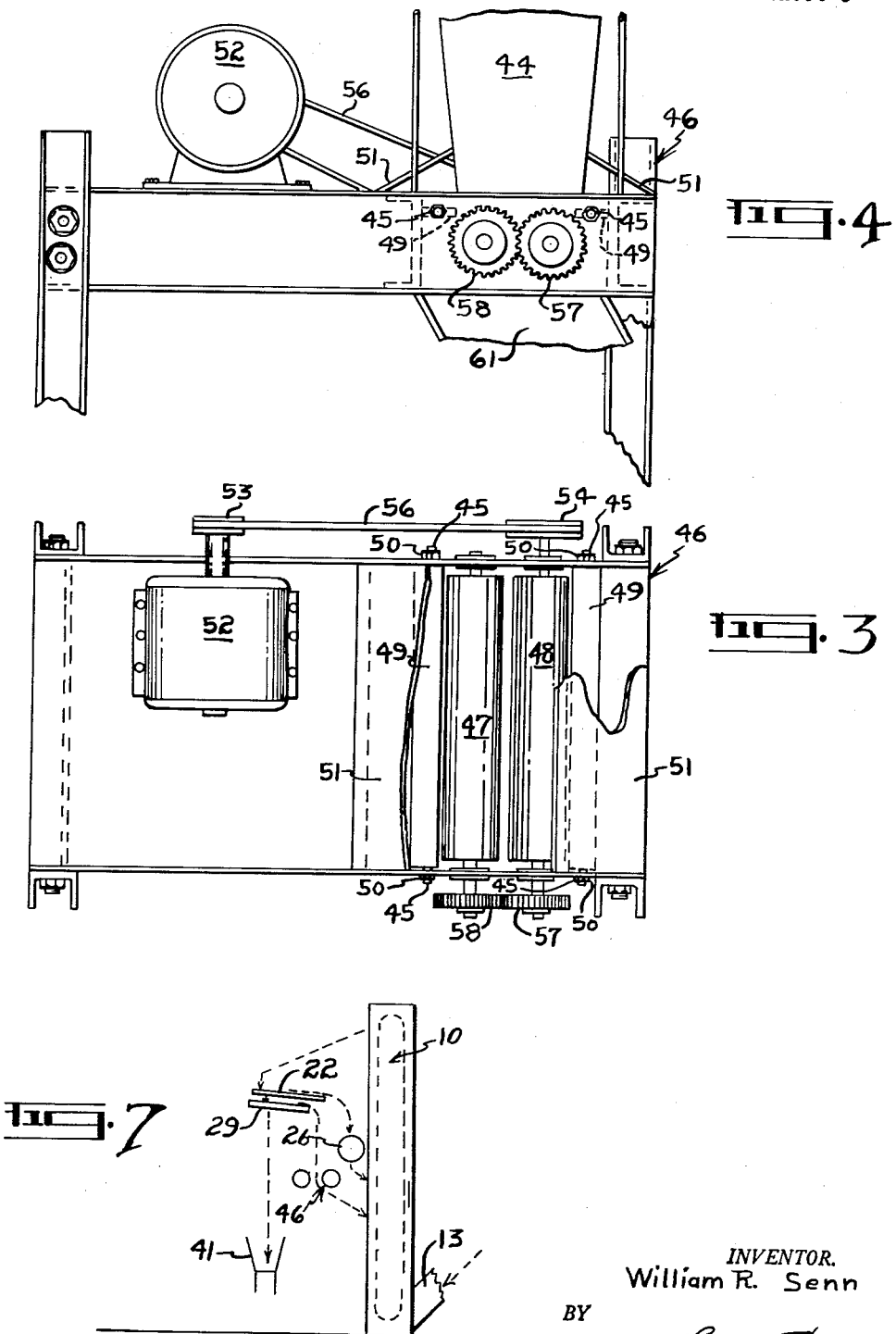

2,987,263
APPARATUS FOR GRANULATING PHOSPHATE ROCK FERTILIZER OR THE LIKE
William R. Senn, Montgomery, Ala.
(618 Oak St., Decatur, Ala.)
Filed Feb. 16, 1959, Ser. No. 793,535
2 Claims. (Cl. 241—76)

This invention relates to apparatus for granulating phosphate rock fertilizer prior to packaging and more particularly to apparatus in which a commingled stream of small, intermediate and coarse size particles is separated into said separate sizes by a pair of screens and each size of particles separately handled so that the final fertilizer has a relatively small amount of dust size particles.

Heretofore, in the handling of phosphate rock fertilizer prior to packaging, the particles have been screened by a single screen and all of the particles retained by the screen have been sent to a grinder or pulverizer, the common form of pulverizer having a plurality of blades extending radially from a hub on a driven shaft with grate bars disposed closely adjacent the blades at between about 1/32–1/16 inch therefrom. The pulverizer or grinder produces a large amount of dust size particles since friction or an abrasive action is used to break the coarse or large particles into smaller particles. A large amount of fine particles, such as dust, is highly undesirable, especially with a material that is hygroscopic, as lumps or large cakes will be formed in such packaged fertilizer under normal ranges of humidity. Also, if the material contains an excess amount of dust it will cake or form into clods or lumps. In the distribution of fertilizer through relatively small openings as commonly found in fertilizer distributors, phosphate rock fertilizer as heretofore produced will "bridge around" the outlet opening, stopping the delivery of the material. Thus, uneven distribution results with the consequence that some of the areas being fertilized receive no fertilizer or too little thereof.

Other prior apparatus for granulating phosphate rock fertilizer to obtain results comparable to results obtained by my apparatus have involved a heating and drying process and apparatus for the fertilizer particles which is time consuming as well as costly.

It is an object of the present invention to provide apparatus for granulating phosphate rock fertilizer having a comparatively large percentage of granules of appreciable size so that the fertilizer is free from an excessive amount of dust and does not easily cake together or form lumps or clods, thereby permitting the fertilizer to be handled and dispensed easily.

It is a further object to provide apparatus for granulating phosphate rock fertilizer or the like which is in the form of a commingled stream of small, intermediate and coarse size particles in which the intermediate size particles are separated from the stream and passed through cracking rolls that reduce them to granules of appreciable size without forming more than a minimum of dust so that they pass through a screen of desired mesh, resulting in a high percentage of properly granulated material and a low percentage of dust size particles. Dust size particles as referred to herein are defined as those particles which pass through a No. 15 screen; that is, one having 15 openings to the inch. Granular particles are defined as those retained by a No. 15 screen.

It is an additional object of my invention to provide apparatus for granulating phosphate rock fertilizer from a commingled stream of small, intermediate and coarse size particles comprising separating the coarse size particles and passing them through a breaker having a plurality of blades extending radially from a hub with adjusting or spacer bars disposed at least 1/4 inch from each side of the blades so that a minimum of dust size particles is formed thereby.

Apparatus showing the constructional features of my invention is illustrated in the accompanying drawings, forming a part of this application, in which:

FIG. 1 is a side elevational view, partly in section, showing apparatus for granulating phosphate rock fertilizer;

FIG. 2 is an end elevational view of the apparatus shown in FIG. 1;

FIG. 3 is a top plan view of the granulator employed in my apparatus to reduce the intermediate size fertilizer particles to a desired granule size;

FIG. 4 is a side elevational view of the granulator shown in FIG. 3;

FIG. 5 is a side elevational, partly diagrammatic view of the breaker used to break up the coarse size particles of phosphate rock fertilizer;

FIG. 6 is a sectional view taken generally along line 6—6 of FIG. 5; and,

FIG. 7 is a diagrammatic view showing the path of the fertilizer as it passes through the apparatus prior to being packaged.

Referring now to FIGS. 1 and 2 for a better understanding of my invention, I show a bucket type elevator indicated generally by the numeral 10 having buckets 11 thereon adapted to convey fertilizer particles from the bottom of a hopper 12 adjacent the lower end of elevator 10. An inlet 13 leads to hopper 12 and a stream of phosphate rock fertilizer consisting of small, intermediate and coarse size particles is fed into hopper 12 through inlet 13. A motor 14 is secured to a side of elevator housing 16 and drives elevator 10 through pulley belt 17 secured to motor 14 and pulley 15 on an end of conveyor shaft 18.

A downwardly inclined chute 21 extends from the upper end of elevator housing 16 and guides the fertilizer discharged therein from bucket elevator 10 downwardly onto a coarse screen indicated generally by the numeral 22. Screen 22 is preferably a number 3 mesh screen; that is, one having three openings to the inch. Screen 22 is inclined downwardly with a smooth surface 23 at the lower end thereof across which coarse size fertilizer particles retained on the screen 22 are discharged. The small and intermediate size particles pass through screen 22 and the coarse size particles retained thereby are discharged into chute 24 which leads downwardly to a particle breaker indicated generally by the numeral 26 and which breaks the coarse size particles into smaller size particles. Breaker 26 is secured to the housing 16 and is driven by pulley belt 25 through suitable pulleys 20 on elevator shaft 18 and breaker 26. After the material has been broken up by breaker 26 it is discharged by chute 27 into elevator housing 16 to move downwardly into hopper 12 where it is picked up by bucket elevator 10 and carried upwardly to be discharged again through chute 21.

A second screen indicated generally by the numeral 29 preferably comprises a number 4 mesh screen (four openings to the inch) is positioned beneath screen 22. Angle members 31 rigidly connect screen 22 to screen 29. Screen 29 is mounted on leaf springs 32 positioned on each side thereof so that screen 29 may be vibrated. An end plate 33 is positioned adjacent the upper end of screen 29 to retain the fertilizer particles on screen 29. A motor 34 having a pulley 36 thereon is mounted on support 35. A shaft 37 is mounted on screen 29 and extends over the sides of the screen with an unbalanced fly-wheel 38 on each end of shaft 37. Shaft 37 is driven by pulley belt 39 extending between pulley 40 on shaft 37 and pulley 36. Thus, upon energizing of motor 34 the lower screen 29 vibrates through the unbalanced fly wheels 38 which, in turn, vibrate upper coarse screen 22 since screen 22 is secured rigidly to lower screen 29.

The small size particles and such dust as has already been made pass through screen 29 while the intermediate size particles are retained thereon. A sacking hopper 41 is positioned beneath screen 29 and the particles passing through screen 29 fall downwardly to the mouth 42 of hopper 41. Suitable sacks (not shown) are positioned over mouth 42 for filling. The intermediate size particles retained by screen 29 are discharged into chute 43 leading to hopper 44 of a granulator indicated generally by the numeral 46.

Referring now to FIGS. 3 and 4 in which granulator 46 is shown in detail, hopper 44 leads to a pair of smooth surfaced cracking rolls 47 and 48. The cracking rolls preferably are spaced approximately 5/32 of an inch apart and may be on the order of 5 3/8 inches in diameter. A cleaning bar 49 in the shape of a flat bar, is positioned adjacent each of the rolls 47 and 48 and removes any material clinging or sticking to rolls 47 and 48. Reduced threaded ends 45 of bars 49 extend through the side plates of granulator 46 and adjusting nuts 50 are fitted thereon. Thus, the distance of bars 49 from rolls 47 and 48 may be varied by adjustment of nuts 50 to rotate bars 49 about the axis of ends 45. Panels 51 are positioned on each side of the hopper 44 and are secured thereto by suitable means. A motor 52 is secured to the upper side of granulator 46 and drives roll 48 through pulleys 53 and 54 connected by pulley belt 56. Roll 48 drives roll 47 through gears 57 and 58. Rolls 47 and 48 reduce the particles passing therebetween at least to size corresponding to the spacing between the rolls. The particles then pass through discharge chute 61 (see FIG. 1) into elevator housing 16 and thence to hopper 12 where they are picked up by elevator 10 and discharged onto the screen 22.

Referring now to FIGS. 5 and 6, I show my breaker or clod knocker indicated generally by the numeral 26, and which is adapted to break lumps and other large size particles into smaller particles. This breaker is a modification of a type commonly used heretofore to reduce large size fertilizer particles to small size particles, and comprises a shaft 64 mounted in bearings 66. A hub 67 is secured to shaft 64 and has a plurality of blades 68 extending radially therefrom. Each of the blades 68 is secured to a side of the hub 67 by a pair of bolts 69. A specific type blade that I have found to be effective is one approximately 3/4 of an inch in thickness, 18 inches long, and 4 inches in width, with four blades secured to a hub.

Spring mounted guide bars 71 are mounted on each side of blades 68 beneath the hub 67 and bolts 72 are secured to the sides of guide bars 71 and extend through the housing of breaker 26. A bracket 73 is secured to the outer side of the housing and springs 74 are interposed between the brackets and the housing around bolts 72. Bolts 72 are threaded on the outer ends and extend through brackets 73 with suitable nuts 76 threaded onto the ends of bolts 72.

A lower guide bar 77 is positioned beneath blades 68 and is spring mounted by a spring 74 on a cross bar 78 extending between side plates of the breaker housing. Blocks 75 secured to the side plates of the breaker housing form support guideways for bar 77 at each end thereof. Side guide bars 71 and lower guide bar 77 are spaced approximately 1/2 inch from blades 68 to provide a relatively large clearance between the sides of blades 68 and the guide bars and permitting the fertilizer particles to move between the blades 68 and bars 71 with a minimum of abrasive action. In the event that rocks or other large particles that are not broken up by my apparatus pass between the blades and bars, the bars move away from blades 68 to compress springs 74 and allow the large particles to pass. It is believed that a spacing between blades 68 and bars 71, 77 of between 1/4 inch and 3/4 inch will work effectively in my process and apparatus. It should be noted that the common type of pulverizer used in phosphate rock fertilizer plants heretofore provides relatively small space between the rotary blades and grate bars as this space is usually between 1/16 and 1/32 of an inch. Thus, it is evident that the pulverizer used heretofore produced a relatively large abrasive action with a corresponding large amount of dust size particles (particles passing a No. 15 screen).

Referring now to FIG. 7, I show in diagrammatic form the flow of the materials. In operation, phosphate rock fertilizer consisting of small, intermediate and coarse size particles is fed through inlet 13 to elevator 10 by which it is conveyed onto coarse screen 22 which retains the coarse size particles and permits the small and intermediate particles to pass therethrough. The coarse size particles, some of which are in the form of lumps, pass through the breaker where they are broken into smaller particles and then returned to the elevator 10 to be delivered again to screen 22. The small and intermediate particles pass through screen 22 and downwardly onto screen 29. The small size particles pass through screen 29 to the sacking hopper where they are sacked. The intermediate size particles are retained on the upper surface of screen 29 and the vibration of screen 29 moves such particles downwardly to the granulator 46. As shown, this apparatus comprises a pair of smooth surfaced cracking rolls that break down the intermediate size particles into the desired granule size while forming a minimum of dust or very fine particles. After the intermediate size particles pass between the rolls of granulator 46, they are delivered to the bucket elevator 10 which carries the particles upwardly to be discharged onto the coarse size screen 22. Thus, after the coarse and intermediate size particles pass through the breaker 26 and granulator 46, respectively, the large majority are of a sufficient size to pass through fine screen 29 to the sacking hopper 41 where they are sacked.

From the foregoing it is evident that by providing two screens, I am able to separate the intermediate size particles from the small and coarse size particles. The intermediate size particles are then passed through the granulator which comprises a pair of smooth surfaced rolls to crack the particles as distinguished from breaking them by impact, thus to form granules of the desired size. The friction or abrasive action against the particles is reduced to a minimum by the smooth cracking rolls and the percentage of very fine particles, such as dust, is held to a minimum. The coarse size particles are passed through a breaker which comprises radially extending blades mounted on a hub with a relatively large spacing between the sides of the blades and the adjacent guide or adjusting bars. By providing the large spacing along the sides of the blades, abrasive action is held to a minimum in my breaker while the breaker adequately reduces the particles size and a fertilizer is obtained that has a higher percentage of granules than heretofore obtained by similar apparatus. Thus, the clogging of dispensing mechanisms and other disadvantageous results from lumping and the like, will be kept to a minimum.

Fertilizer containers, such as paper bags, are filled at the sacking hopper in two or three seconds each and due to this relatively short time with no vibration, an amount of entrapped air is obtained. By reducing the amount of dust, the entrapped air is reduced likewise and a smaller volume is initially required for the fertilizer product as it comes from the sacking hopper than required heretofore. Thus, a smaller container may be used with my process and apparatus than used heretofore.

In one installation of my improved granulating apparatus in a fertilizer plant having a capacity of 60 tons of fertilizer per hour, the final fertilizer produce obtained at the sacking hopper by my process and apparatus was from 35% to 55% granular (particles retained by a No. 15 screen) and from 45% to 65% dust or fines (particles passing a No. 15 screen). In addition the capacity of the plant was increased from between 10 and 15 tons per hour to obtain about a 20% increase in total capacity.

By comparison, the fertilizer plant before my apparatus was employed and while using a single screen and a single pulverizer as commonly used heretofore produced a final product at the sacking hopper of from 85% to 90% dust and 10% to 15% granular. That is, it is evident that by my process and apparatus the percentage of dust is decreased by between 30% and 40% which produces a semi-granular fertilizer.

While I have shown my invention in but one form, it will be obvious to persons skilled in the art that it is not so limited, but is susceptible of various changes and modifications without departing from the spirit thereof, and I desire, therefore, that only such limitations be placed thereupon as are specifically set forth in the appended claims.

What I claim is:

1. In apparatus for granulating a phosphate rock fertilizer while in a commingled stream of small, intermediate and coarse size particles wherein means are provided to segregate the small, intermediate, and coarse size particles; the combination with said apparatus of a breaker disposed adjacent said means to receive the coarse particles therefrom, said breaker comprising a rotary cutter having a plurality of blades extending radially in a generally vertical common plane, a lateral guide bar resiliently mounted on each side of the rotary cutter for horizontal movement and beneath which the blades extend, a lower guide bar resiliently mounted directly beneath the vertical extent of the blades for vertical movement relative to the blades, and means to receive and return the particles to the segregating means after they pass through the breaker.

2. In apparatus for granulating a phosphate rock fertilizer while in a commingled stream of small, intermediate and coarse size particles, wherein a coarse screen retains coarse size particles and passes small and intermediate size particles; the combination with said apparatus of a breaker disposed adjacent said coarse screen to receive particles retained thereon, said breaker comprising a rotary cutter having a plurality of blades extending radially in a generally vertical common plane, a lateral guide bar resiliently mounted on each side of the blades and biased toward said blades, a lower guide bar resiliently mounted directly beneath the vertical extent of the blades and being biased toward said blades, said lateral and lower guide bars being spaced between ¼ and ¾ inch from the blades, and means to receive and return the particles to the coarse screen after they pass the cutter.

References Cited in the file of this patent
UNITED STATES PATENTS

| | | |
|---|---|---|
| 619,335 | Nitsch | Feb. 14, 1899 |
| 732,779 | Pape | July 7, 1903 |
| 1,349,221 | Nolen | Aug. 10, 1920 |
| 2,072,157 | Day | Mar. 2, 1937 |
| 2,117,300 | Corser | May 17, 1938 |
| 2,210,093 | Morrissey | Aug. 6, 1940 |
| 2,670,775 | Elofson | Mar. 2, 1954 |

FOREIGN PATENTS

| | | |
|---|---|---|
| 77,583 | Denmark | May 24, 1954 |